Feb. 27, 1962  F. V. PALASCIANO  3,022,907
ITEM HANDLING APPARATUS
Filed May 26, 1959  7 Sheets-Sheet 1
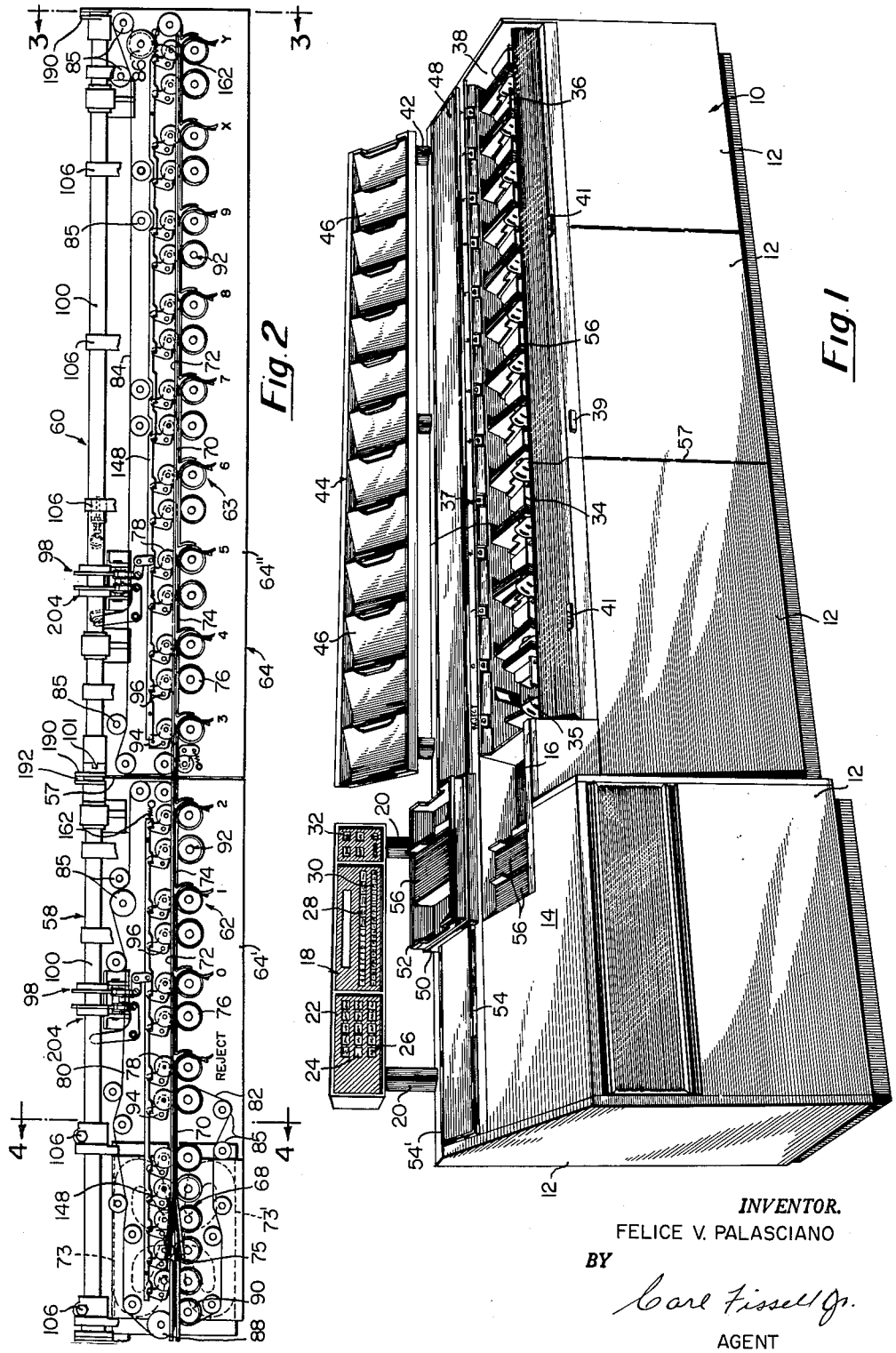
INVENTOR.
FELICE V. PALASCIANO
BY
Carl Fissell Jr.
AGENT

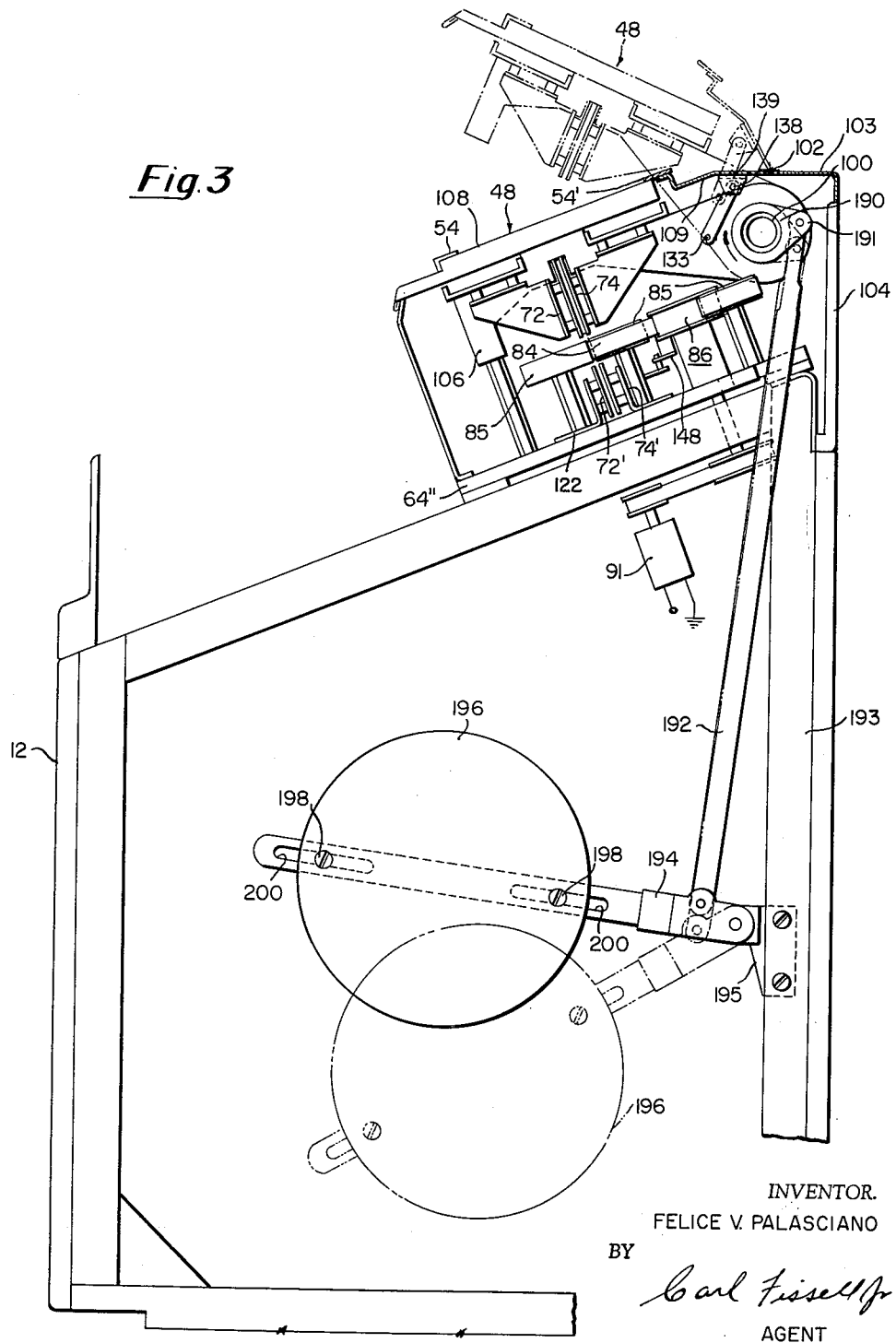

Feb. 27, 1962 — F. V. PALASCIANO — 3,022,907
ITEM HANDLING APPARATUS
Filed May 26, 1959 — 7 Sheets-Sheet 6

INVENTOR.
FELICE V. PALASCIANO
BY
AGENT

Feb. 27, 1962    F. V. PALASCIANO    3,022,907
ITEM HANDLING APPARATUS
Filed May 26, 1959    7 Sheets-Sheet 7
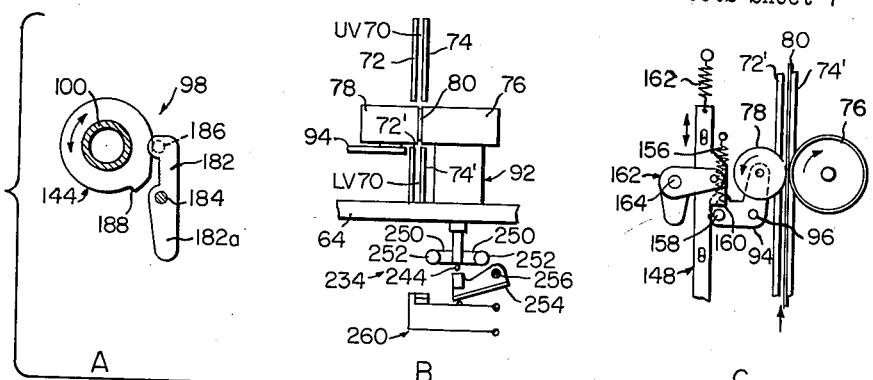
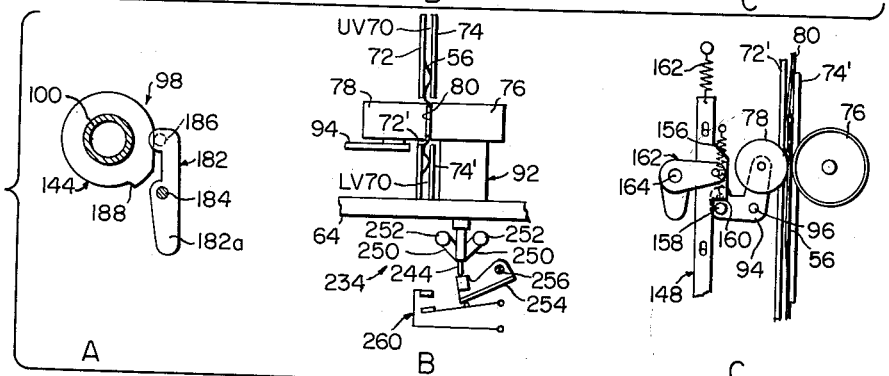
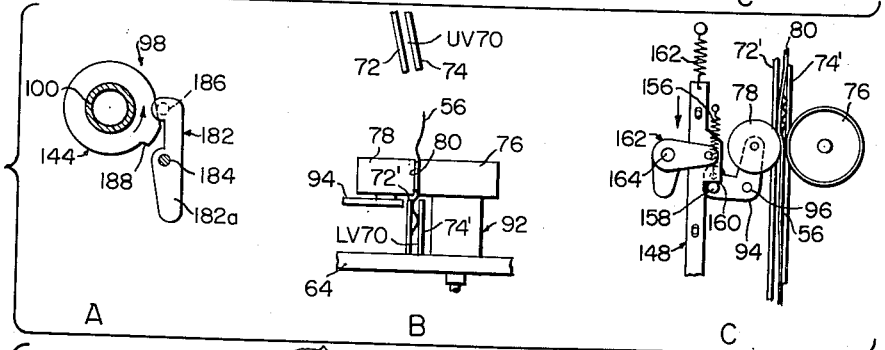
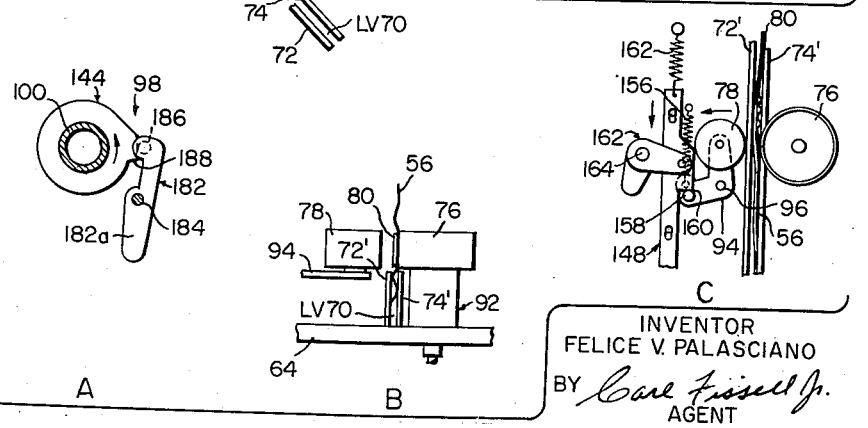
INVENTOR
FELICE V. PALASCIANO
BY Carl Fissell Jr.
AGENT

United States Patent Office 3,022,907
Patented Feb. 27, 1962

3,022,907
ITEM HANDLING APPARATUS
Felice V. Palasciano, Philadelphia, Pa., assignor to Burroughs Corporation, Detroit, Mich., a corporation of Michigan
Filed May 26, 1959, Ser. No. 816,005
17 Claims. (Cl. 214—11)

This invention relates to sheet item handling apparatus, and more particularly, to such apparatus for handling or processing bank checks, deposit slips etc. With still more particularity, the invention has to do with item sorters such as described and claimed in the copending U.S. patent applications in the name of Walter Hanstein, Serial No. 732,920, filed May 5, 1958, and entitled "Magnetic Selection Apparatus," and in the name of Charles B. Hebeler, Serial No. 771,851, filed November 4, 1958, and entitled "Magnetic Selection Apparatus," both of which are assigned to the assignee of the present invention.

The apparatus disclosed in these copending applications includes item transport chutes formed by two separate but edge-aligned groups of elongated vanes or blades. All of the vanes of each group terminate together at one end to form the entrance to the chutes, while their other ends terminate at the various item stacker pockets to which the chutes lead the items being processed. Magnetic means is provided to selectively separate the chute entrance ends of the vanes to receive items designated for a particular pocket. Between the separated groups of vanes means is provided for moving the items through the chutes to the pockets, including a plurality of confronting pairs of rollers frictionally engaged and driven by endless tapes or belts rotated by power driven rollers. The peripheries of the confronting pairs of rollers meet the driving tapes in the space between the adjacent and aligned edges of the groups of vanes.

A problem in these sorters is the jamming of items in the transport chutes. Item jams may be caused by a variety of conditions, but these are not important here. Needless to say, however, it is important to take quick and effective action to shut off the machine and remove the jammed items, thus to minimize damage both to the items and to the machine, and to minimize the "down time" of the machine.

It is an important object of the present invention, therefore, to provide item transport apparatus which solves the foregoing problem in a novel and unusual manner.

It is another important object of the present invention to provide a novel item transport mechanism wherein item jams are quickly and automatically detected in a manner immediately shutting off operation of the mechanism, and including mechanism effective upon simple manipulation to free jammed items for easy removal.

In accordance with the foregoing objects, and first briefly described, the invention comprises item handling apparatus including a plurality of elongated item chute forming blades having ends terminating in a chute entrance area and other ends terminating at item stacker pockets. The entrance ends of the chute forming blades are controlled to open selected chutes in accordance with the designated pockets to which the items are to be directed. Drive means is provided to move items through the chutes to the designated pockets.

Associated with the drive means is means for detecting an item jam in the transport chutes and immediately shutting off the machine. A movable part of the item handling apparatus is operably associated with the item transport mechanism whereby movement of the movable part is effective to operate mechanism to release the items for easy removal from the chutes by hand. Return of the movable part to its original condition restores the transport mechanism to operative condition.

These and other objects and advantages will become more apparent to persons skilled in the art from the following description taken together with the accompanying drawings wherein:

FIG. 1 is a perspective view of an item sorter incorporating the preferred embodiment of the present invention;

FIG. 2 is a top plan view of the item transport apparatus of FIG. 1 with its cover removed;

FIG. 3 is a right-hand side elevational view taken along the line 3—3 of FIG. 2;

FIGS. 9–12 are schematic step-by-step views of the various operating positions of the item transport mechanism and chute vane assembly of the present invention illustrating the operation of the jam release mechanism.

Figure 4:
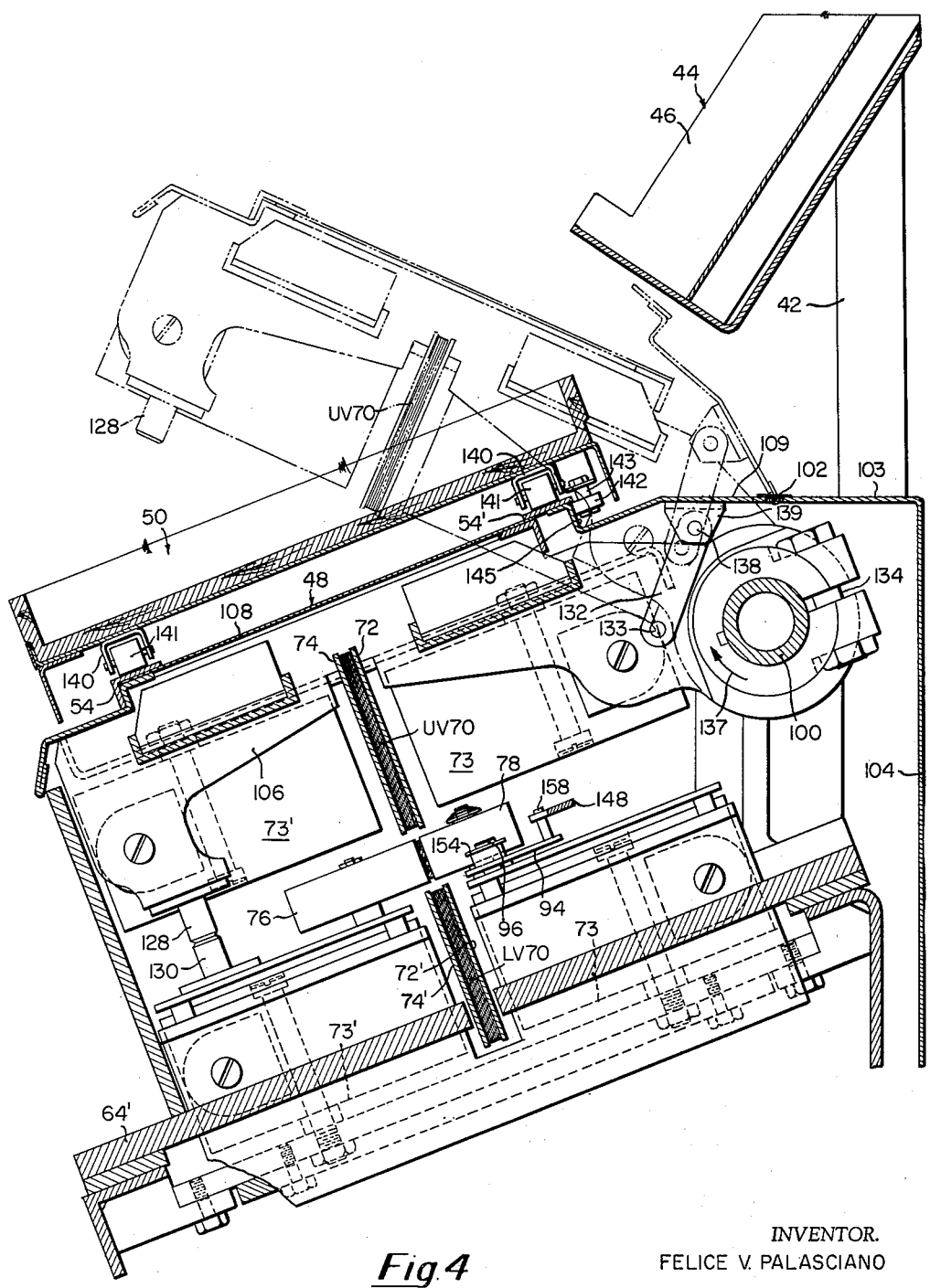
FIG. 4 is a sectional view of a portion of the machine taken along the line 4—4 of FIG. 2.

Referring first to FIG. 1 of the drawings, there is shown an item sorter machine embodying the preferred form of the present invention. Generally described the machine includes a substantially rectangular box-like cabinet structure, hereinafter referred to as the base 10, provided with a number of removable front, side and rear panels, only certain of which, all identified by the common numeral 12, are visible in this figure. The top panel or cover 14 on the upper left side of the base 10 is canted forwardly and downwardly at an angle of approximately 21½° as is the entire top work surface of the machine. This angle permits greater handling ease and comfort for the operator, as well as convenience and accessibility to component assemblies located both above and beneath the cover.

An item loading hopper-feeder 16 is disposed in the left end portion of the structure. Directly above hopper 16 at the rear of the left end of the base 10 is located an easily accessible and conveniently arranged control panel 18 supported on suitable short posts or pedestals 20. The control panel includes a row of lights 22 to indicate various operating conditions of the machine, a row of operating controls 24 for energizing the apparatus, another row of communication lights 26 for additional item handling condition indications, a row of field selector keys 28 for selecting sorting fields for each item processed by the apparatus, a row of digit selecting keys 30 for selecting a specific sorting field digit, and a group of operating controls 32 for stopping and resetting the item handling apparatus.

To the right of the loading hopper 16 is located a row of thirteen stacker pockets 34 comprising a reject pocket 35, ten digital pockets numbered 0 through 9, and two special pockets 36 and 38, in that order. Each of these pockets is connected, in a manner described in detail in the aforementioned Hanstein application, with the magnetically controlled item transport chutes therein described, and shown in part in the present FIG. 2, so that items can be selectively sorted at extremely high speeds, in the order of 400″ per second. Each pocket is provided with a warning light 37 indicating to the operator that the pocket is full. A centrally located start control button or bar 39 is disposed in the front of the base 10 intermediate two emergency stop control buttons 41. Disposed on pedestals 42 on the top rear section of the base 10 is a temporary item storage rack 44 including thirteen separate relatively shallow item bins 46. The bins are angularly offset with respect to the top and bottom edges of the rack 44 to enable the operator to remove or replace stacks of items easily and quickly.

The item transport mechanism of the present apparatus is completely enclosed except for the receiving pockets, as shown in FIG. 1, so as to provide maximum safety to the operator and, to exclude dust, dirt and foreign matter from the moving parts. In order to provide easy accessibility to the transport mechanism, especially when items become jammed in the chutes, there is provided an elongated relatively narrow hinged cover or lid 48 over this mechanism. The cover extends across the item transport mechanism of the machine from end to end and is pivotally mounted to the rear of the base 10, in a manner to be described shortly.

For the operator's convenience in handling and moving small bundles or packets of items across the machine, a mobile carrier 50, supporting a detachable item tray 52, is movable along the entire length of the sorting area on a pair of parallel tracks 54 and 54' disposed on the exposed surface of cover 48. The present item handling apparatus is designed so that items 56 can be inserted in feeder 16 while the apparatus is in operation, as described in the copending U.S. application to Misbin et al., Serial No. 772,552, filed November 7, 1958, entitled "Sheet Stack Advance Mechanism," and to Solyst, Serial No. 781,729, filed December 19, 1958, entitled "Sheet Feeder," both of which are assigned to the same assignee as the present invention.

Referring now to FIG. 2, it is seen that for convenience of fabrication, assembly, servicing and maintenance or moving of the machine, base 10 can be divided at 57 into two separate assemblies, thereby forming a four pocket section 58 including the reject and the "0," "1" and "2" pockets, and a nine pocket section 60 including the remaining pockets.

The item transport mechanisms, 62 and 63 for each pocket section 58 and 60 is supported on a frame 64 comprising individual longitudinal frame members 64' and 64", respectively. The chute forming apparatus 68 for the item transport comprises a pair of spaced groups of elongated blades or vane members 70. The vanes of each group are disposed parallel to one another and extend lengthwise of the machine terminating in the pockets in each of the two sections. The vanes are supported between opposite side wall members 72 and 74 aligned across the length of the machine, as shown in FIG. 2. The vane ends 75 of each group terminate in the same area between pairs of magnetic members 73 and 73', shown in dotted outline at the left of FIG. 2. The magnetic members together with electro-magnetic means, not shown, on each vane end serve to actuate the vane ends 75 to open and thus select a particular chute leading to a designated pocket, all as described and claimed in the above Hanstein and Hebeler applications.

The items, such as bank checks, are fed through the chutes lengthwise on one of their longer edges and with their opposite lengthwise edges in the groups of chute forming blades. Upon reaching the designated pocket forming blades the items are turned out of their normal straight line path of movement, FIG. 2, into their respective pockets and aligned therein by means such as described and claimed in two copending U.S. patent applications to John G. Smith for "Document Handling Apparatus," Serial No. 773,592, filed November 13, 1958, now Patent No. 2,944,813; and "Item Handling Apparatus," Serial No. 798,744, filed March 11, 1959, now Patent No. 2,970,836, both of which are assigned to the same assignee as the present invention.

Disposed along the side wall members 72 and 74 are a plurality of confronting pairs of pressure rollers 76 and 78. These rollers are frictionally engaged and rotated by endless drive belts 80, 82 and 84. The drive belts, as shown pass around idler and tensioning rollers 85 and between adjacent pairs of rollers 76 and 78. Each belt is driven by means of an individual drive pulley 86, 88 and 90 rotated in a conventional manner by drive motors such as shown at 91 in FIG. 3. As seen more clearly in FIG. 7, the larger diameter rollers 76 are rotatably supported on a short hollow pedestal or shaft 92 fixed to a respective frame member 64. The smaller diameter pressure rollers 78 are rotatably mounted on L-shaped angle arms or bell cranks 94 pivotally mounted on pins 96, as will be more fully described hereinafter.

By means of cam release mechanism 98 (FIGS. 2 and 5) one of which is disposed intermediate the ends of each of the pocket sections and in a manner to be described in detail later on, the pressure rollers 78 may be retracted from the rollers 76, thereby to release any item or items which may have become wedged or jammed along the item transport path.

Figure 6:
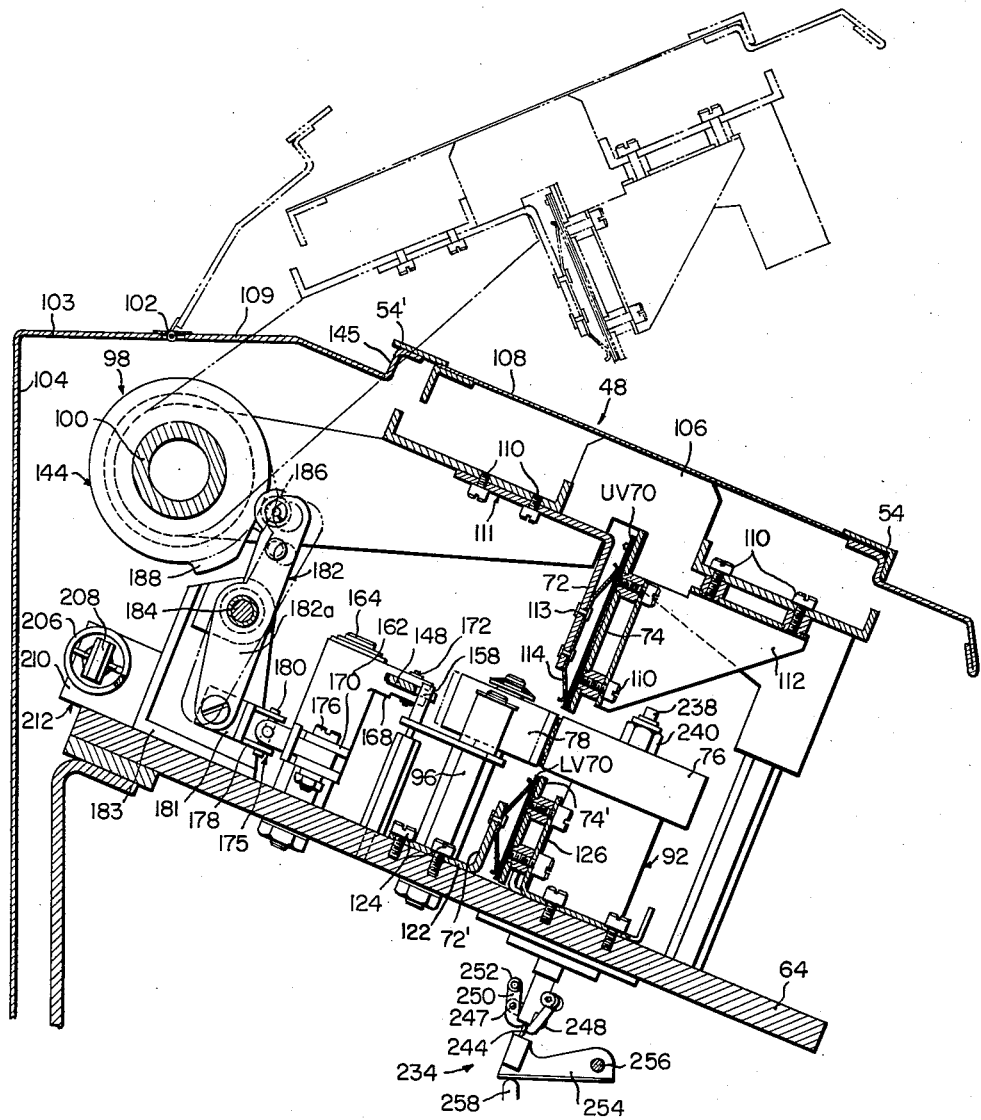
FIG. 6 is a sectional side view taken along the line 6—6 of FIG. 5.

Situated at the upper rear of the base 10 is an elongated two part tubular shaft 100 separably joined at 101 (FIG. 2) and extending from one end of the transport mechanism to the other. This shaft carries cover member 48 which comprises forward and rearward portions 108 and 109 respectively, for the purpose to be described hereinafter. As shown in FIGS. 3, 4 and 6, an elongated piano type hinge 102 pivotally mounts the rearward cover portion 109 of the lid 48 to a shelf 103 formed by a forwardly bent portion of rear wall 104, FIG. 3. Located at suitable places along the shaft 100 are a number of supporting arms 106 to which the forward portion 108 of lid 48 is secured, as by bolts 110 (FIG. 6).

As set forth in more detail in the Hanstein application earlier mentioned herein, the chute forming vanes 70 consist of upper and lower sets UV70 and LV70 respectively, FIGS. 4 and 6. The upper set of vanes UV70 is mounted between a pair of the parallel wall forming members 72 and 74 which are secured as by bolts 110 to the forward lid portion 108 by angle brackets 111 and gussets 112, respectively. It is evident, as later described herein, that upward movement of the lid or cover portion 108 will raise the upper set of vanes relative to the lower set providing access to the vane area. This feature of the apparatus is described and claimed in the copending application for patent of Harold M. Frederick, Serial No. 857,960, filed December 7, 1959, and entitled "Sheet Item Handling Apparatus," and assigned to the same assignee as the present invention. It may be desirable, in some instances, for the vanes to be pressed together into a stacked face to face relationship against wall member 74 by means of a resilient member 114, which may be a spring leaf, attached to wall member 72 as by rivets 113, as shown in FIG. 6. Gussets 112 also serve to rigidify the wall 74 in a manner resisting the horizontal thrust of the vanes 70 as they are opened slightly when items are transported therebetween during sorting or other handling operations.

The lower set of vanes LV70, FIG. 6, is mounted in similar fashion as the upper vanes UV70 except that the lower vanes and the wall forming members 72' and 74' are slightly narrower. The member 72' is secured by means of angle brackets 122 to the frame 64 by means of bolts 124. Likewise the wall member 74' is bolted to the upstanding portion of an angle bracket 126, bolted to frame 64. Members 128—130 provide means for spacing the upper set of vanes from the lower vanes.

Referring now to FIG. 4, it will be seen that the two part cover 48—forward and rearward parts 108 and 109 respectively—also carries a link 132 pivotally mounted at one end 133 on the right hand portion of member 106 which is secured to shaft 100 by means of the bolt 134. The opposite end of link 132 is pivotally secured as at 138 on a yoke member 139 fixed to the underside of rear cover member 109. As the forward portion 108 of lid 48 is elevated, manually in this case, shaft 100 rotates clockwise in the direction of the arrow 137 causing the link 132 to move from its full line position to its broken line position, thus elevating the rearward portion 109 of the cover relative to portion 108, as shown. It will be understood that cover member 109, because of the location of hinge 102 relative to pivot 138, will move upwardly independently of cover member 108 and at a faster rate of speed thus to move out of the way of cover member 108 during its opening movement. The cover has been so constructed to simply the hinging problem caused by the location of shaft 100 beneath shelf 103. This mechanism permits the forward portion 108 of the cover carrying the upper vanes UV70 to move arcuately upwardly without interference from the cabinet structure.

The mobile carrier 50, on lid 48, FIG. 4, comprises a shallow rectangular box-like member for carrying the item tray 52, FIG. 1. At each of the four corner portions of the underside of carrier 50 there is provided a U-shaped member 140 mounting a roller 141 on which the tray is movable over the tracks 54 and 54'. Since the work surface of the apparatus is slanted downwardly toward the operator area at approximately 21½°, carrier 50 is prevented from falling forward by means of a pair of hanger rollers 142, only one of which is visible in FIG. 4. These rollers are carried on a stud 143 which is attached to the bottom rear portion of the carrier 50 in a manner such that the periphery of the rollers contact the stepped rear side 145 of the cover member 109.

Occasionally, for one reason or another, items become jammed in the transport chutes and must be removed. For ease of removal it is desirable to hold all of the items in the lower vanes LV70 rather than having some of them retained in and dangling from the upper vanes UV70 when the latter are in their raised position. To this end the apparatus now to be described is effective to clamp the items within the lower vanes during the first portion of the pivotal movement of cover 48—until the upper vanes are out of contact with the items—while the last portion of the cover movement is effective to release the items for easy removal by hand.

Figure 5:
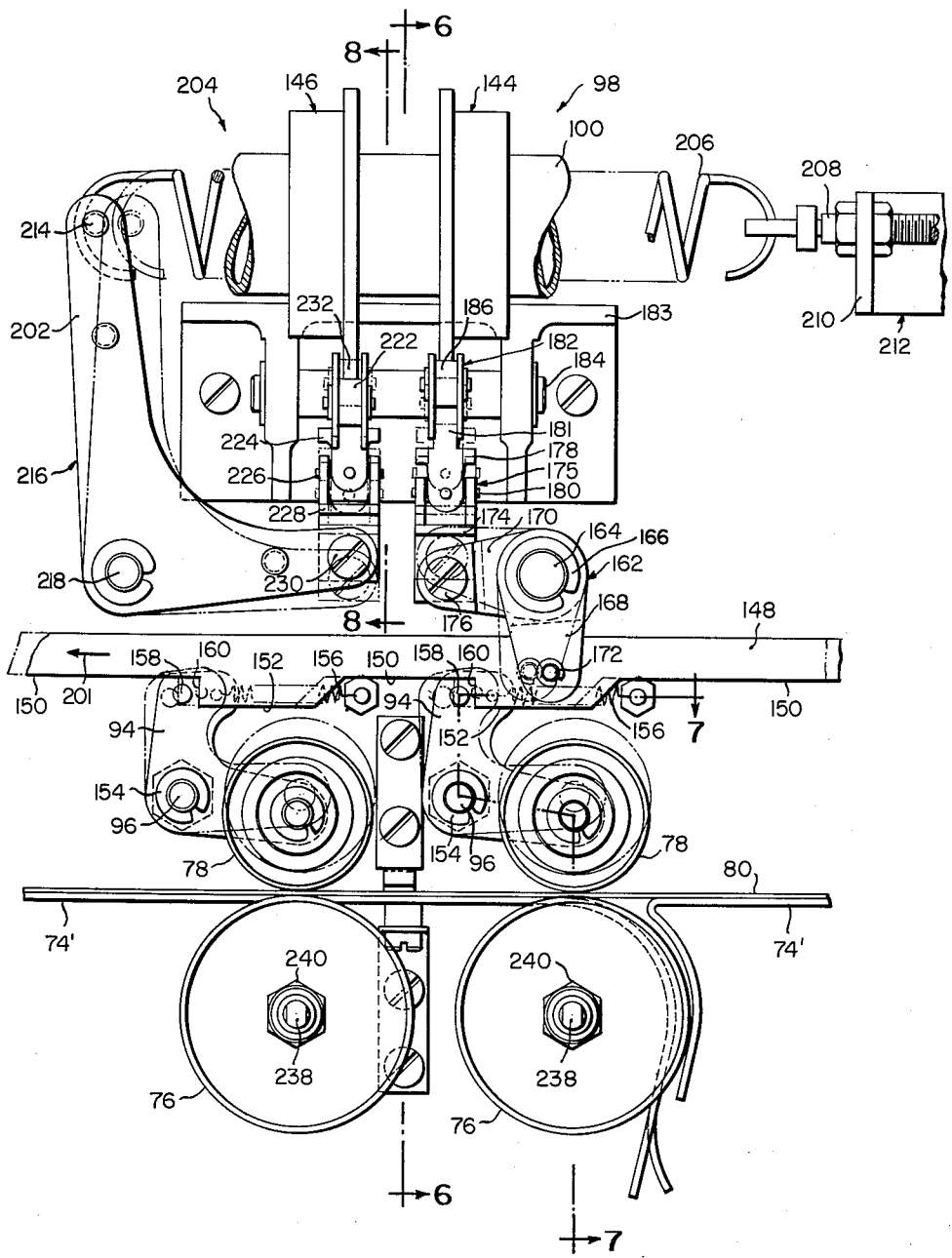
FIG. 5 is an enlarged view of a portion of the mechanism of FIG. 2 illustrating the item jam release apparatus.

Referring to FIGS. 2, 5 and 6, and, more particularly to FIG. 5, there is shown a pair of cams 144 and 146 secured to and movable with shaft 100. An item pressure roller actuating member comprising an elongated rigid bar 148 having a plurality of notches 150 and projections 152 along one edge portion thereof, is provided for each of the pocket sections 58 and 60, as shown most clearly in FIG. 2. As described above, individual bell cranks 94, pivoted to frames 64 by pins 96, carry the item pressure rollers 78 at one end thereof. Split washers 154 lock the cranks 94 to the pins 96. The opposite end of each crank 94 is provided with an upstanding projection or pin 158 positioned in the path of movement of edge 160 of the projection 152 on actuator 148. Each bell crank 94 is biased clockwise, about its pivot 96 by means of a spring 156 secured at one end to the frame, and at its opposite end to the end of the bell crank adjacent a respective pin 158.

In the foregoing manner the smaller diameter rollers 78 are constantly peripherally engaged with one surface of the drive belts 80 or 84, as the case may be. Each drive belt is in turn pressed against the opposite peripheral surface of each of the larger diameter rollers 76. Thus when the drive belts are moving, the pressure rollers are caused to rotate. Any item entrained between the upper and lower sets of vanes UV70 and LV70 is carried along by the belts and the confronting pairs of pressure rollers.

Disposed between the actuator 148 and the shaft 100 is an operating linkage for releasably engaging and disengaging the pressure rollers 78 from the rollers 76 so as to permit items which may have become jammed therebetween to be removed. Means for driving the actuator member 148 is provided by the crank member 162 pivotally mounted on the frame 64 by means of a stud shaft 164 to which it is suitably secured by C-ring 166. Crank member 162 is provided with upper and lower bifurcated arms or extensions 168 and 170, respectively, extending from member 162 approximately 90° apart. Actuator bar 148 passes through the bifurcated end of upper extension 168 and is pivotally secured thereto by a pin 172.

The bifurcated end section of the lower extension 170 straddles and is pivotally secured to one end of a link 174 by a pin 176. The other end of link 174 forms one section of a universal joint 175, the other section of which is formed by oppositely disposed parallel arms of a second link 178, both sections being connected together by cross pins 180, see FIG. 6. The arm 181 on the other end of link 178 is pivotally connected to and between the lower ends of the parallel arms 182a of a vertically disposed cam follower 182, see FIGS. 5 and 6. The follower arm is rockably mounted in a cradle 183 on a horizontal shaft 184, the ends of which are journalled in the cradle walls. Carried between the upper ends of the follower arm 182 is a follower roller 186 which is urged against the periphery of cam 144 and adapted to engage and be moved by the cam protuberance or lobe 188 whenever the lid 48 is moved from the full to the dotted line position shown in FIG. 6.

Referring to FIG. 3, it can be seen that shaft 100 is provided at its extreme outer end with a hub member 190 having an extension 191 to which is attached to an elongated link 192 pivotally secured at its opposite end to a counter-weight arm 194, which in turn is pivoted to a bracket 195 on a rear vertical support member 193 of base 10. A counter-weight in the form of a disk 196 is secured to and adjustably positionable along the counter-weight arm 194 by means of bolts 198 and slots 200 in the arm. A second substantially similar counter-weight arrangement, although not shown herein, is disposed at the opposite end of shaft 100.

Thus it is seen that when the lid or cover 48 is raised by the operator, shaft 100 is rotated clockwise with the help of the weight of disk 196 so that the lid 48 as well as the disk moves from the full line position to the broken line position, as shown. As shaft 100 rotates, the lobe 188 on cam 144 is rotated counter-clockwise, as seen in FIG. 6, from its full line position, to the broken line position. This motion of the cam causes the lobe 188 to move under and rock the follower arm 182 about shaft 184 in a clockwise direction causing the lower portion of the arm to drag links 178 and 174 leftwardly thus to rotate arm 170 (FIG. 5) and member 162 about shaft 164. Simultaneously, upper extension 168 of member 162 is rotated in a clockwise direction, as seen in FIG. 5, from its full to its broken line position, moving actuating member 148 to the left in the direction of arrow 201 and against the tension of springs 156. The leftward edge 160 of each of the projections 152 thus engage respective studs 158 on bell cranks 94. Further movement of actuator 148 as cam 144 rotates with shaft 100, rotates bell crank 94 in a counter clockwise direction thus to retract pressure rollers 78 away from the respective drive belts and rollers 76 to free any items jammed therebetween.

Still referring to FIG. 5 of the drawing, it can be seen that as the actuator member 148 of each of the two item pocket sections are moved leftwardly against the tension of the springs 156, a torque or counter force is developed due to the stretching of the springs. In order to offset or counter-balance this torque build up, a counter balance mechanism 204, FIG. 5, is utilized, as now will be described.

Figure 8:
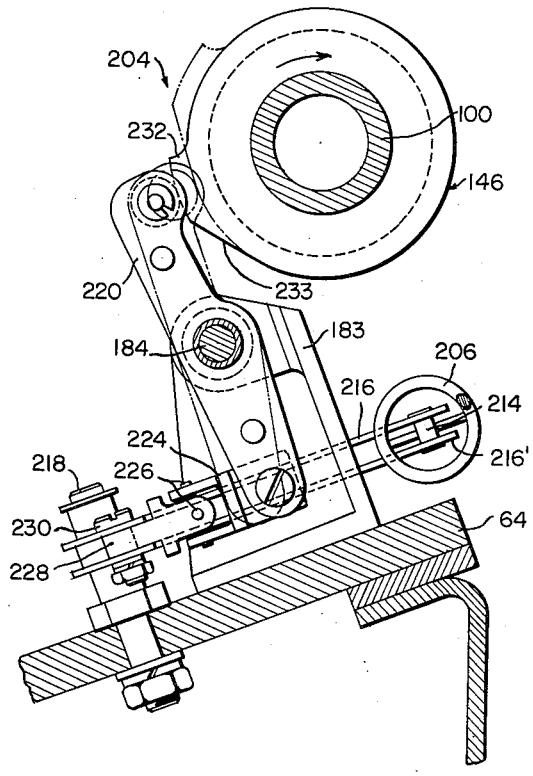
FIG. 8 is a sectional view taken along the line 8—8 of FIG. 5.

Disposed below and parallel to shaft 100 is a relatively stiff coil spring 206, one end of which is secured to an adjusting turnbuckle 208, which latter member is mounted to the upturned ear 210 of a supporting member 212 secured to the frame 64. The opposite end of the spring 206 is detachably mounted over a stud 214 disposed between the ends of the longer arms 202 of bell cranks 216—216' (see FIG. 8) pivotally mounted on the frame 64 by means of a short shaft 218. A cam follower arm 220 substantially identical to arm 182 and having a follower roller 222 rotatably mounted at one end thereof, is pivoted for vertical rocking movement about shaft 134. The depending end of the arm 220, as seen in FIG. 8, is movably mounted to link 224 which is coupled by cross pins 226 to a second link 228 in the manner of a universal joint. The rightward end of bell crank 216, as seen in FIG. 5, is pinned to one end of link 228 by bolt 230.

As shaft 100 is rotated during raising of lid 48, cam 146 is rotated therewith causing the cam follower roller 222 to move off the top of the lobe 232, as seen in FIG. 8, to the slope 233. Movement of roller 222 down the slope under the strong pressure of spring 206 effects a turning movement to be exerted against the cam in the direction of the arrow (on the cams) sufficient to counterbalance the force of springs 156. At the completion of the raising of lid 48, cam 146 and follower 220 is in the broken line position indicated in this figure, and the spring force is cancelled out against shaft 100. Return of lid 48 to its closed position returns this counter-balance mechanism to its full line condition with roller 222 on top of lobe 232 ready for the next opening of the lid.

Figure 7:
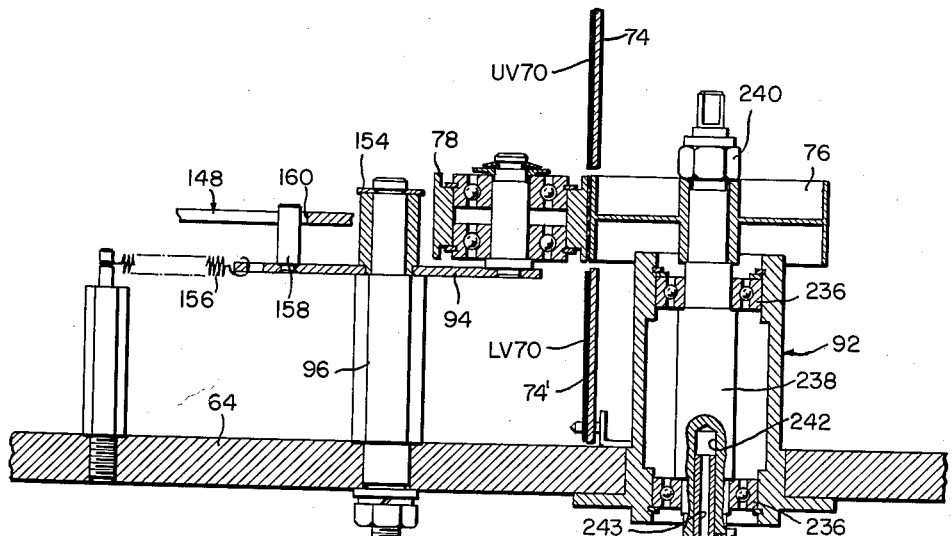
FIG. 7 is a sectional view taken along the line 7—7 of FIG. 5.

In order to quickly and easily detect an item jam in the transport mechanism and shut down the apparatus, a plurality of control means are provided throughout the aforedescribed transport mechanism. These means are exemplified herein by the jam detection control mechanism 234, shown most clearly in FIGS. 6 and 7. Referring first to FIG. 7, it is seen that each hollow pedestal or shaft 92 is provided at each end with a bearing member 236 rotatably supporting roller shaft 238. Roller 76 is secured to one end of shaft 238 for rotation therewith by means of the nut 240. The opposite end of shaft 238 is hollowed axially for a short distance to provide a cylindrical recess or chamber 242 into which a sleeve 243 is secured by means of a screw. A plunger member 244 is slidably received within sleeve 243. A spring 246 is positioned in the lower end of sleeve 243 with one end against an offset or shoulder intermediate the ends of the sleeve and its other end against a flange 245 on the plunger 244 thus to bias the plunger downwardly from the sleeve. Pivotally mounted as at 247 to outrigger members or tabs 248 integral with the lower end of sleeve 243 are individual arms 250 each having a weight 252 attached to its outer end and in the manner of a "fly ball governor." The opposite end 253 of each arm 250 is hook shaped and, as shown in FIG. 7, rests against the under side of plunger flange 245.

In its normal condition, spring 246 presses the lower end of plunger 244 into engagement with the end of an actuator arm 254 fixed to a shaft 256 extending from end to end of the item transport mechanism. It is understood, of course, that the shaft is in multiple parts, for convenience of insertion in each pocket section. An actuator 254 is located beneath each roller supporting pedestal 92.

As shown in FIG. 7 the "governor" mechanism is in its inoperative condition, that is, the transport mechanism is not operating. In this condition, plunger 244 is in its lowermost position with the lower end having rotated actuator 254 downwardly to open the normally closed switch 260 positioned beneath the actuator. The switch is electrically connected in circuit with a source of power and the apparatus drive motors such as shown at 91, FIG. 3 and in a manner such that when switch 260 is electrically "opened" as will be described hereinafter, the drive motors are stopped, halting operation of the item transport drive mechanism. Closure of one of the "start" switches electrically overrides the open switch 260 and the transport mechanism moves to normal operating speed which is sufficient to cause the weighted ends of arms 250 to move outawrdly and downwardly thus to raise plunger 244 permitting switch 260 to close and override the now open starting switch.

While more than one switch 260 may be provided for each pocket section of the machine, it is only necessary to provide one for each section. Rotation of shaft 256 by any one of the arms 254 will effect actuation of the switch.

With regard to the overall operation of the present apparatus, attention is directed to FIGS. 9 through 12 wherein there is shown a series of schematic illustrations of the step by step manner in which an item jam is detected, located and then released. Each of these figures include three portions identified A, B and C, presenting respectively:

(A) A sectional view of the cam release mechanism, see FIG. 6;

(B) A sectional view of the pressure rollers and jam detection mechanism, see FIG. 6; and, (C) A fragmentary plan view of the mechanism shown in (B), see FIG. 5.

With reference first to FIG. 9 wherein the item transport mechanism is assumed to be in operation, rollers 76 and 78 are being rotated by belt 80 in the direction of the respective arrows causing items, not shown, to be transported therebetween. The cam release mechanism 98 is shown in its inoperative condition. The upper chute blades UV70 are shown in their normal operative position, while the jam detecting and indicating mechanism 234 is shown with the arms 250 extended and the drive motor control switch 260 closed.

An item jam condition is illustrated in FIG. 10 in which an item 56 has become buckled or crimped within the chute between the pressure rollers 76 and 78 and the drive belt 80, so that the roller 76 is stopped. Substantially instantaneously, the arms 250 of the jam detection indicator are retracted by the plunger 244 which moves the actuator 254 to depress the switch plunger 258 opening switch 260 and cutting off power to the drive motors stopping the entire machine. The cover 48 must now be raised to remove the jammed item.

In FIG. 11 which is an intermediate position in the raising of the cover 48, the partially raised cover has elevated the upper vanes UV70 to expose the jammed item or items to view and at this same time free it from the upper vanes. Simultaneously, the release actuating cam 144 has rotated a short distance in the direction of the arrow 262 causing the pressure roller 78 to begin its retracting movement away from pressure roller 76.

Finally, in FIG. 12, the lid is fully raised, terminating rotation of the jam release cam 144 and elevating the upper chute vanes to their fully retracted position. In this condition the pressure rollers 76 and 78 are completely separated, rollers 78 having completed their movement in the direction of the arrow 264, permitting easy withdrawal or removal of the jammed item 56.

As set forth in the above identified Hanstein and Hebeler applications, opposed magnetic members 73 and 73' are provided for each group of vanes UV70 and LV70. Therefore, when the upper vanes UV70 are moved upwardly with cover 48, the magnets associated therewith are also moved upwardly with them. It will be understood, therefore, that the mechanism provides means to free item jams anywhere along the transport mechanism from the chute entrance at 75, FIG. 2, to pocket Y at the right hand end of the machine.

From the above it is seen that the present invention provides novel mechanism for handling and transporting sheet items, wherein item jams are quickly detected and the machine shut down, and wherein the operator is able immediately and easily to locate and remove any jammed items.

What is claimed is:

1. Item handling apparatus comprising: a plurality of elongated item chute forming blades arranged in parallel relationship with one end of each blade terminating in the same area to form chute entrances, and the other ends of the blades terminating at item stacker pockets; means adjacent said chute entrances to move said one ends selectively to open a particular chute leading to a selected pocket; means adjacent said blades for moving items through the chutes to the pockets; means for inactivating said last means in response to jamming of items in said chutes; means enabling a portion of said blades to be moved away from said item moving means while said item moving means exerts a retaining grip on said items; and means operably associated with said blade moving means and movable thereby for subsequently releasing said items from the retaining grip of said item moving means.

2. Item handling apparatus comprising: a plurality of elongated flat item chute forming blades arranged in parallel face to face relationship with one end of each blade terminating in the same area to form chute entrances, and their other ends terminating successively at item stacker pockets; magnetic means adjacent said one ends to move the said ends selectively to open a particular chute leading to a selected pocket; means adjacent side edges of said blades for moving items through selected chutes to the pockets; means for inactivating said last means in response to jamming of items in said chutes; means enabling a portion of said blades to be pivotally moved away from said item moving means while said item moving means exerts a retaining grip on said items, and means operably associated with said blade moving means and movable thereby for subsequently releasing said items from the retaining grip of said item moving means for removal from said item moving means.

3. Item handling apparatus comprising: a first and a second group of elongated flat item chute forming blades, the blades of each group being arranged in parallel face to face relationship with one end of each terminating in the same area and their other ends terminating successively at item stacker pockets, said groups of blades being spaced from each other in edge alignment; means adjacent said one ends to move the said one ends selectively to open a particular chute leading to a selected pocket; means between said blade groups for moving items through selected chutes, with one edge of said items in said first group of blades and another edge in said second group of blades; means for inactivating said item moving means in response to jamming of items in said chutes; means enabling said first group of blades to be moved away from said item moving means while said item moving means retains said items in said second group of blades; and means operably associated with said blade moving means and movable thereby for subsequently releasing said items from the retaining grip of said item moving means for manual removal from said second group of blades.

4. A construction according to claim 3 and including means pivotally mounting said first group of blades for said movement away from said item moving means, and means responsive to such pivotal movement after said first group of blades is removed from said items to effect activation of said item releasing means.

5. A construction according to claim 4 and wherein said item moving means comprises a plurality of pairs of pressure rollers, and belt means for driving said rollers, and wherein said means responsive to such pivotal movement comprises a cam, a bell crank mounting one roller of each pair, and a linkage operable by said cam near the end of said pivotal movement for rotating said bell cranks to move said one roller of each pair away from the other roller of each pair.

6. An item jam release mechanism for sheet item handling apparatus including a plurality of vanes having ends sidewise movable within opposed magnetic fields comprising, a plurality of pressure rollers forming a pathway therebetween through which items are moved, means to rotate said pressure rollers, means to move a portion of said vanes toward and away from said rollers and said drive means, and means coupling said vane moving means and said pressure roller moving means and operable to separatingly disengage said pressure rollers from said drive means when said vane moving means move said portion of said vanes away from said rollers and said drive means thereby to release said items from between said pressure rollers.

7. In an item jam release mechanism for item handling apparatus wherein a plurality of vanes are disposed in two parallel groups and are provided with end portions which are sidewise movable within opposed magnetic fields, and wherein one of said groups of vanes is bodily movable relative to the other group of vanes, the combination comprising: a plurality of pairs of pressure rollers adapted to entrain items therebetween; means to rotate said pressure rollers thereby to move said items between said vanes; means to engage and disengage said pressure rollers with said means for rotating said pressure roller; means to move one of said groups of vanes relative to the other group of vanes and to said pressure rollers so as to expose said pressure rollers to view; and means interconnecting said vane moving means and said pressure roller engaging means whereby the movement of said vanes away from said rollers disengages said rollers from said drive means thereby to free any items entrained between said rollers and said drive means.

8. Item handling apparatus comprising, a plurality of item chute forming vanes disposed in two spaced parallel groups, the ends of said vanes being sidewise movable within opposed magnetic fields to open a selected chute, a plurality of aligned pairs of pressure rollers disposed in the space between said vane groups and defining an item pathway therebetween, means to rotate said pressure rollers whereby items entrained therebetween are fed through said chutes along said pathway, means for engaging and disengaging said pressure rollers with said means to rotate said rollers, means providing for movement of one of said groups of vanes relative to another of said groups of vanes such that in one relative position, the two groups of the vanes are closely positioned on opposite sides of said drive means while in another relative position one of said groups of vanes is moved away from said drive means and the other group of vanes, and means operatively interconnecting said last means with the pressure roller engaging and disengaging means whereby relative movement between said vane groups causes the roller rotating means to be separated from the pressure rollers thereby releasing any items disposed therebetween.

9. The invention according to claim 8 wherein said means to rotate said pressure rollers comprises a continuous flexible belt.

10. Item handling apparatus comprising an upper plurality of vanes and a lower plurality of vanes, said upper and lower vanes being coextensive and parallel and forming throughout their length a plurality of item pathways terminating in item receiving pockets, a plurality of pairs of pressure rollers disposed along said pathway between said upper and lower vanes, endless drive means for said rollers extending the length of said pathway, means to engage and disengage certain of the rollers of each pair of pressure rollers with said drive means, means to move said upper plurality of vanes relative to said lower plurality of vanes, means operatively connecting said upper vane moving means with said means for engaging and disengaging certain of said pressure rollers with said drive means whereby the relative movement between said upper and lower plurality of vanes causes certain of said pressure rollers to be disengaged from said drive means whereby an item disposed between said rollers is released, and means coupled to said upper vane moving means for counter balancing the weight of said upper vanes.

11. In an item handling apparatus in which a plurality of vanes or blades are sidewise movable in the nature of flaps and wherein an item sorting pathway is defined by a plurality of pairs of interengagable rollers disposed throughout the longitudinal extent of said blades, the combination comprising, continuous flexible drive means for said rollers, said drive means being adapted to contact the surface of said items thereby to move said items between said pairs of rollers along said pathway, means to engage and disengage certain of said rollers with said drive means, an enclosure for said sorting pathway extending from end to end thereof, means mounting said enclosure for pivotal movement toward and away from said pathway and said pairs of rollers, means interconnecting said mounting means and said roller engaging and disengaging means whereby as said enclosure is moved away from said pathway to expose said rollers to view, certain ones of said rollers are disengaged from said drive means, and means at opposite ends of said mounting means for counter balancing the weight of said enclosure.

12. Item handling apparatus comprising, a plurality of vanes disposed in a parallel stack extending longitudinally of said apparatus and terminating in individual item pockets, magnetic members on opposite sides of one end of said stack of vanes and producing magnetic fields within which said one ends are selectively sidewise movable thereby to provide an entrance to respective ones of said pockets, a plurality of pairs of rollers adjacent said vanes, continuous drive means for said rollers, means for engaging and disengaging certain of said rollers with said drive means, an enclosure for said apparatus, means mounting said enclosure for pivotal movement toward and away from said rollers and said drive means, means on said mounting means operably connected with said roller engaging and disengaging means and movable conjointly with said enclosure whereby as said enclosure is moved away from said rollers and said drive means said certain ones of said rollers are disengaged from said means, means on said mounting means for biasing said enclosure toward said rollers, and, means operably connected to said mounting means for counteracting said biasing means.

13. Item handling apparatus comprising, a first plurality of elongated substantially flat vanes, a second plurality of similarly elongated flat vanes, said vanes being disposed in two parallel spaced apart groups forming an item pathway extending longitudinally of said apparatus, one end of each of said vanes in each group being sidewise movable within a plurality of opposed magnetic fields, means mounting said first plurality of vanes for movement toward and away from said second plurality of vanes, means biasing said first plurality of vanes away from said second plurality of vanes, a first plurality of pressure rollers, a second plurality of pressure rollers, said pressure rollers being disposed in confronting pairs located between said first and said second plurality of vanes along said item pathway, drive means for said pressure rollers and extending therebetween, means to engage and disengage said first plurality of pressure rollers with said drive means, cam means on said mounting means and movable therewith, and, means operably interconnecting said cam means and said first plurality of rollers and adapted to move said rollers against said biasing means in response to movement of said mounting means thereby to separate said first plurality of vanes from said second plurality of vanes subsequently to disengage said first plurality of pressure rollers from said drive means.

14. In a mechanism of the class described, an item jam release mechanism comprising a plurality of chute forming vanes disposed in parallel providing an item pathway therebetween, a plurality of pairs of pressure rollers disposed along said pathway, a drive belt disposed between confronting peripheral surfaces of each pair of rollers and in contact therewith, said drive belt being adapted to rotate said rollers and to thereby move items along said pathway, an actuator member for engaging and disengaging said rollers with said belt, means for biasing said actuator member in one direction, a rockable shaft, a cam on said shaft, and a bell crank operably interengaging said cam and said actuator member and movable in response to movement of said cam for moving said actuator in a direction to withdraw and thereby release certain of said rollers from engagement with said drive belt.

15. Item jam release mechanism comprising a shaft, a pair of complementary cams disposed on said shaft, means to rotate said shaft, an actuator member adjacent to and extending the length of said shaft, means biasing said actuator member in one direction, a bell crank, a first pressure roller rotatably mounted on one end of said bell crank, a second pressure roller opposite said first pressure roller, an endless drive belt, extending between said first and second pressure rollers, means connected to the opposite end of said bell crank biasing said crank and thus said first roller into contact with said drive belt and against said second roller, a cam follower arm, one end of said follower arm engaging one of said pairs of cams, the opposite end of said follower arm being interconnected to said actuator member whereby as said cam moves with said shaft said actuator member is given a rectilinear movement against said biasing means withdrawing said first pressure roller from said drive belt, and means engaging the other of said complementary cams and bearing thereagainst for counter-balancing the forces generated by each biasing means.

16. In an item handling apparatus wherein the ends of a plurality of upper and lower chute forming blades terminating in item pockets are sidewise movable within the magnetic fields of the confronting poles of a plurality of magnets, an item jam release mechanism comprising, an elongated row of pairs of pressure rollers extending between said upper and lower chute forming blades and providing an item pathway therebetween, an endless belt extending between said rollers and adapted to drive the same, means biasing certain of said rollers into peripheral engagement with said belt, means for pivotally rocking one roller of each pair out of contact with said belt, an elongated shaft pivotally mounted adjacent to and coextensive with said chute forming blades, means mounting said upper blades on said shaft for pivotal movement with said shaft when the shaft is rotated to move the upper blades toward or away from said lower blades, means on said shaft operably engaging said means for pivotally rocking said one roller of each pair and movable thereby in response to movement of said shaft for retractably withdrawing said one roller of each pair from engagement with said endless belt, and counter-balance means for constantly biasing said one roller of each pair of rollers into engagement with the other roller of each pair.

17. An item handling apparatus comprising a rectangular base structure, means on said base structure supporting a plurality of chute forming blades disposed therein in parallel side by side relationship and terminating at one end thereof in respective item pockets, the opposite ends of each blade being sidewise movable in the nature of flaps within opposed magnetic fields of a plurality of magnetic members, a plurality of pairs of pressure rollers forming an item pathway therebetween extending the length of said blades, said pressure rollers being disposed on opposite sides of said blades, a drive member extending between and in surface contact with each pair of rollers, an enclosure for said pathway, a movable shaft disposed from end to end of said pathway, means mounting said enclosure on said shaft, means on said shaft interconnecting said shaft and said rollers for engaging and disengaging said rollers with said drive member in response to movement of said enclosure, means biasing said rollers into engagement with said drive member, and means operably connected to said shaft for counteracting said biasing means.

References Cited in the file of this patent

UNITED STATES PATENTS

| | | |
|---|---|---|
| 1,738,103 | Hasman et al. | Dec. 3, 1929 |
| 2,123,237 | Ford | July 12, 1938 |